United States Patent
Van Deventer et al.

(10) Patent No.: US 7,120,506 B1
(45) Date of Patent: Oct. 10, 2006

(54) METHOD, SYSTEM, CONVERTER AND SWITCH FOR ASYNCHRONOUS TRANSMISSION-MODE (ATM) COMMUNICATION

(75) Inventors: Mattijs Oskar Van Deventer, Leidschendam (NL); Herman Pals, The Hague (NL); Eduani Thomas Metz, Leiden (NL); Ronaldus Albertus Cornelis Van Riet, Capelle aan den Ijssel (NL)

(73) Assignee: Koninklijke KPN N.V., Groningen (NL)

( * ) Notice: Subject to any disclaimer, the term of this patent is extended or adjusted under 35 U.S.C. 154(b) by 867 days.

(21) Appl. No.: 10/130,193

(22) PCT Filed: Oct. 30, 2000

(86) PCT No.: PCT/EP00/10746

§ 371 (c)(1),
(2), (4) Date: Nov. 21, 2002

(87) PCT Pub. No.: WO01/41495

PCT Pub. Date: Jun. 7, 2001

(30) Foreign Application Priority Data

Nov. 30, 1999 (NL) .................................... 1013698

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 12/26* (2006.01)
*H04L 1/00* (2006.01)

(52) U.S. Cl. .................. 700/18; 370/237; 370/218; 370/227; 370/470; 709/227; 709/226; 379/221.01

(58) Field of Classification Search ................. 700/18; 370/237, 218, 470, 355; 709/226, 227
See application file for complete search history.

(56) References Cited

U.S. PATENT DOCUMENTS

| | | | | |
|---|---|---|---|---|
| 5,239,537 A | * | 8/1993 | Sakauchi | 370/218 |
| 5,278,889 A | * | 1/1994 | Papanicolaou et al. | 348/14.01 |
| 5,289,579 A | * | 2/1994 | Punj | 709/227 |
| 5,398,236 A | * | 3/1995 | Hemmady et al. | 370/218 |
| 5,450,409 A | * | 9/1995 | Diaz et al. | 370/470 |
| 5,495,426 A | * | 2/1996 | Waclawsky et al. | 709/226 |
| 5,732,078 A | * | 3/1998 | Arango | 370/355 |
| 5,898,673 A | * | 4/1999 | Riggan et al. | 370/237 |
| 5,991,301 A | | 11/1999 | Christie | |
| 6,081,525 A | | 6/2000 | Christie et al. | |

FOREIGN PATENT DOCUMENTS

| | | |
|---|---|---|
| EP | 0 711 052 A1 | 5/1996 |
| WO | WO 97/09807 | 3/1997 |
| WO | WO 97/35407 | 9/1997 |
| WO | WO 98/49864 | 11/1998 |

OTHER PUBLICATIONS

B. Law and R. R. Knight: "Access Signalling—Q.2931 and Related Standards", British Telecom Technology Journal, vol. 16, No. 2, Apr. 1998, pp. 58-74.
International Telecommunications Union (ITU) : ITU-T Recommendation I.371, particularly Chapter 5, "Traffic Parameters and Descriptors", Aug. 1996, entire document.

* cited by examiner

*Primary Examiner*—Anthony Knight
*Assistant Examiner*—Sunray Chang
(74) *Attorney, Agent, or Firm*—Frishauf, Holtz, Goodman & Chick, P.C.

(57) ABSTRACT

Method, system, converter and switch for communication in asynchronous transmission mode (ATM) between a source end station (13) and a destination end station (14) by means of information cells and data cells following the information cells, the information cells representing a signalling message containing an information element (IE) which contains an indication of a requested kind of traffic contract (ATC) for, in accordance therewith, processing the data cells. When a kind of traffic contract requested from a switch of the system or from the destination end station is not supported, but a kind of traffic contract which is not more unfavorable than a kind of traffic contract requested by the source end station (13) is supported, the signalling message is converted, the requested kind of traffic contract being replaced by the other kind of traffic contract as the new requested kind of traffic contract, in such a way that eventually there is converted back to the kind of traffic contract supported by the destination end station (14), which is equal to the kind of traffic contract requested by the source station. After each conversion, the data cells of a traffic flow received are processed in accordance with the kind of traffic contract to which there is converted.

13 Claims, 7 Drawing Sheets

FIG. 1

Prior Art

FIG. 2

Prior Art

METHOD, SYSTEM, CONVERTER AND SWITCH FOR ASYNCHRONOUS TRANSMISSION-MODE (ATM) COMMUNICATION

This application is a U.S. National Phase Application under 35 USC 371 of International Application PCT/EP00/10746 filed Oct. 20, 2000.

The invention relates to a method according to the preamble of claim 1.

A method of this type is described, e.g., in the paper "Access signaling—Q.2931 and related standards" by B. Law and R. R. Knight; in BT [=British Telecom] Technol. J., Vol. 16, No. 2, April 1998, pp. 58 to 74 inclusive; in Handboek Elektrotechniek, November 1998, F0460, paragraph 7.3, "Fast packet switching and ATM"; and in various Recommendations of the International Telecommunication Union (ITU), such as ITU-T Recommendation 1.371, particularly Chapter 5, "Traffic parameters and descriptors".

The known method will be explained below with reference to FIG. 1, in which a system, wherein the method is applied, is schematically shown.

Figure 1:
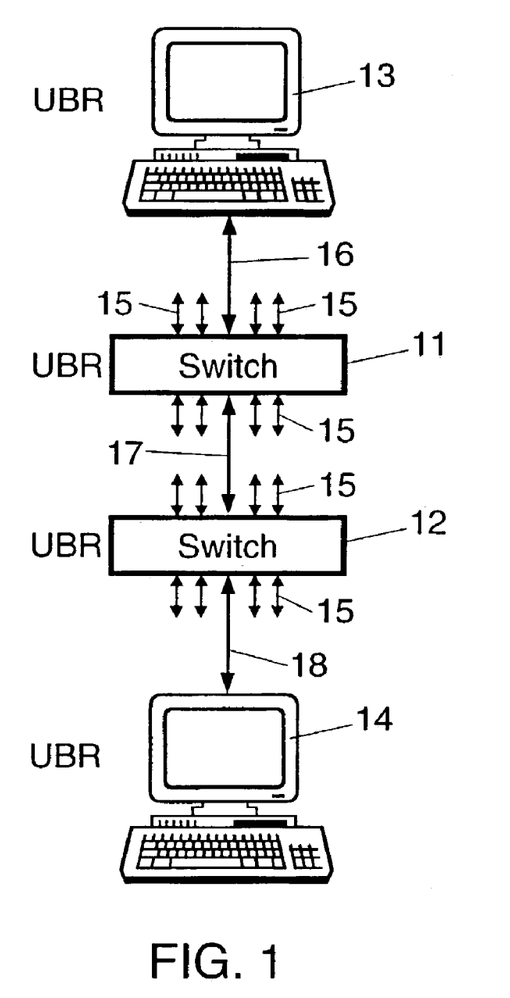
FIG. 1 shows a known ATM communication system.

FIG. 1 shows an example of a communication system which operates in the asynchronous transmission mode (ATM). The system includes two switches or switching devices 11 and 12 which are connected to one another and to end stations 13 and 14, respectively. The switches 11 and 12 may be equal and the end stations 13 and 14 may be equal. In addition, the switches 11 and 12 may be connected to more switches and end stations. This is indicated by double arrows, such as 15, which depart from the switches. The system is suitable for setting up a connection or communication between the end stations 13 and 14, by way of a link 16, the switch 11, a link 17, the switch 12 and a link 18, respectively.

An ATM communication system is suitable for the transmission of digital data from various services, such as television, telephony and various Internet services. That is why the end stations 13 and 14, presented as computers in FIG. 1 and in other figures, serve only as an example.

In an ATM communication system, transfer of digital data takes place by way of packets. An ATM packet is called a cell, and has a fixed length of 53 octets, 48 of which are intended for data and 5 for a header containing checking and routing information.

The information of the header of a cell comprises:
- HEC (Header Error Control): is a check sum for error detection;
- PT (Payload Type): indicates whether the cell has a special function (3 bits);
- CLP (Cell Loss Priority): a cell-loss priority bit for distinguishing between cells having a high or low priority;
- VCI (Virtual Channel Identifier): identifies an individual connection within a path;—VPI (Virtual Path Identifier): identifies a path over which several (similar) connections run (8 bits) between an end station and a network node of a UNI (User Network Interface) and 12 bits between two switches or network nodes of an NNI (Network Node Interface);
- GFC (Generate Flow Control): for the transfer of information over a traffic flow of the network to an end station (4 bits, only for a UNI).

A physical link of an ATM communication system may simultaneously support several connections, distributed over several paths, each having a number of channels assigned to individual connections, respectively. A combination of a VPI and a VCI of the VPI path is called a logical connection or virtual circuit VC. For a specific connection, e.g., between the end stations 13 and 14, the pairs of VPI and VCI for different links, such as 16, 17, 18 of the connection, generally are independent and different from one another. During the setup of the connection, the pairs are chosen by switches 11 and 12, and maintained for the duration of the connection.

Two types or kinds of cell may be distinguished. A first kind of cell contains information which is used for signalling, particularly for setting up a requested connection according to a desired diagram or kind of contract for traffic-flow handling. Such cells are designated below as information cells.

Another type of cell contains the data proper which is being exchanged from one end station to another end station. Such cells are designated below as data cells.

Figure 2:
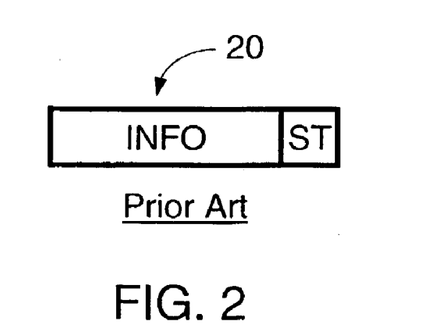
FIG. 2 schematically shows a signalling information cell.

FIG. 2 schematically shows an information cell 20 whose header contains an ST (Signalling Type) indication.

Figure 3:
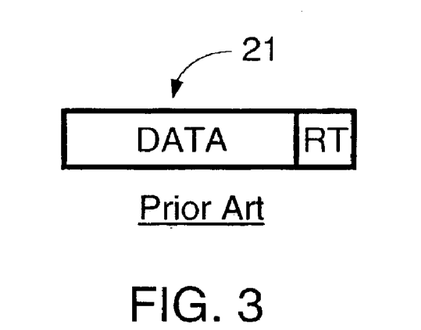
FIG. 3 schematically shows a data cell.

FIG. 3 schematically shows a data cell 21 whose header contains an RT (Routing Type) indication, which implies for which end station the data of the cell is intended.

Figure 4:
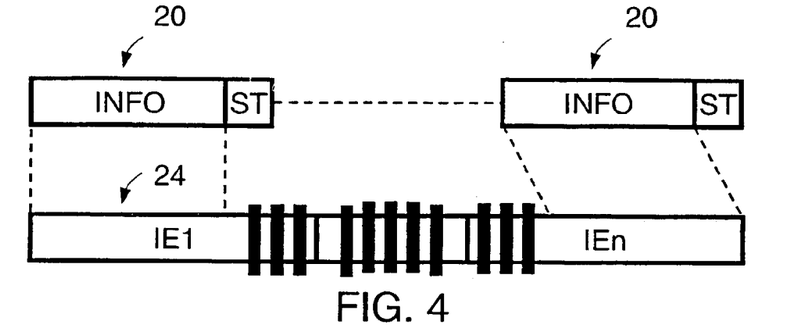
FIG. 4 schematically shows the composition of a signalling message from several information cells.

When the end station 13, as the source end station, requests the setup of a connection having the end station 14 as destination end station, the end station 13, over the virtual circuit of the link 16, transmits a series of information cells 20 to the switch 11. The switch 11 distinguishes the information cells from other types of cells and combines the data of the information cells 20. This is shown in FIG. 4. According to FIG. 4, the data of a series of information cells 20 forms a signalling message 24 consisting of several information elements IE1, . . . , IEn. The information elements contain, inter alia, information on an ATM kind of traffic contract or ATC (ATM Transfer Capability), consisting of several components, including a Traffic Descriptor IE, which in its turn consists of a set of traffic parameters describing the properties of the kind of traffic handling requested, by the source end station 13 or a switch 11, from a next switch 12 of the connection or the destination end station 14.

There are several kinds of contracts or ATCs, e.g.:
- DBR (Deterministic Bit Rate): a continuous flow of ATM cells;
- SBR (Statistical Bit Rate): a fluctuating flow of cells according to agreed statistical properties;
- ABR (Available Bit Rate): a flow of cells which adapts itself to the amount of traffic;
- UBR (Unspecified Bit Rate): a flow of cells referred to above without specific traffic properties, the cell-loss priority (CLP) bit being ignored;
- CBR (Constant Bit Rate): a constant flow of cells having a guaranteed bandwidth (e.g., for uncompressed, real-time video information);
- VBR (Variable Bit Rate): a flow of cells having a variable bandwidth with an agreed average and an absolute maximum.

A kind of contract is indicated as being of higher quality of service (QoS) or more favourable, at any rate not more unfavourable, if a kind of contract to be presented by a communication system complies with stricter requirements than another kind of contract, at any rate at least complies with the same requirements. Thus, e.g., the DBR kind of contract, where no time delay occurs, is of higher quality or more favourable than the SBR kind of contract, where it can and may occur; and the DBR kind of contract is more favourable than the UBR kind of contract in connection with a cell loss being admissible or not.

Due to the relatively simple communication structure in an ATM system maintaining a connection once it is set up, and simple, locally valid addressing of connections in cells, very fast communication may be achieved. To achieve the high speed, the connections in the switches 11, 12 are set up substantially by hardware specifically designed for this purpose. A switch 11, 12 therefore comprises, for each kind of contract, a buffer for storing cells received from various source end stations 13 and other switches and for, depending on the amount of traffic, reading from the buffer, in accordance with the kind of contract, and transmitting the cells to a next switch or a destination end station. Such a hardware implementation is expensive, the switch for each kind of contract having to possess such a buffer and associated control means. As a result, one is strongly limited in the number of buffers one would want to apply in a switch, and an ATM-network manager may only offer the limited number of associated contracts to users of the end stations 13, 14. As indicated in FIG. 1 on the side, the end stations 13, 14 request a traffic handling according to the UBR kind of contract and the switches support, apart from possible other kinds of contract, the UBR kind of contract.

When, during the setup of a connection from the source end station 13 to the destination end station 14, a node or switch 11, 12 is reached which does not support the requested kind of contract, the setup of the connection halts and the source end station 13 will not be capable of communicating with the destination end station 14. Since the two end stations 13, 14 may be connected to one another by way of a series of ATM networks, each having a number of switches of different owners and managers, chances are that one of the switches of the desired connection does not support a kind of contract requested from the switch, and the requested connection with the destination end station cannot be set up.

Although there is a great need of a very fast communication network, a need which may be met by an ATM network, the great diversity in kinds of traffic contracts and the costs of the application thereof in the various switches impedes further development of geographically wide-spread ATM networks and, as a result, investment in switches supporting various kinds of contract.

The object of the invention is to remove the drawbacks of the known method.

For this purpose, the invention provides a method as described in claim 1.

As a result, it will be possible to process traffic presented by the source end station with a greater chance of realising a connection with the destination end station and in accordance with the kind of traffic contract of the source end station. In addition, the ATM infrastructure is better utilised, which may lead to an earlier expansion thereof for a greater processing capacity for traffic according to existing kinds of traffic contract and/or for enlargement of the number of supported kinds of traffic contract.

The invention further relates to a system, a converter and a switch for communication in the asynchronous transmission mode (ATM) according to claims 11, 12 and 13, respectively.

The invention is explained below by reference to the enclosed drawings. In the drawings.

Figure 5:
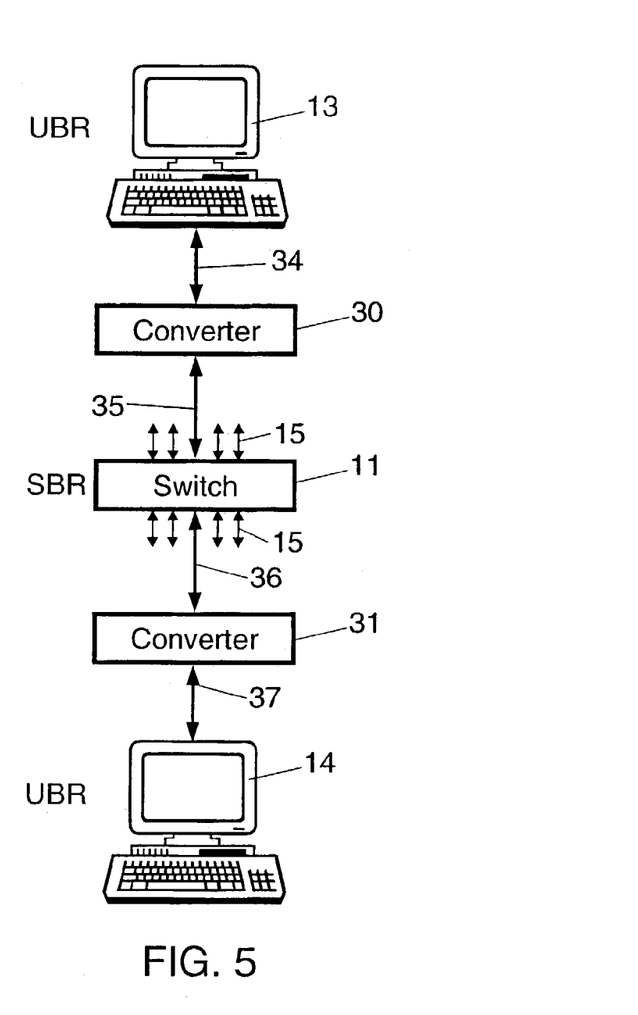
FIG. 5 shows a first embodiment of an ATM communication system according to the invention.

The ATM communication system according to the invention shown in FIG. 5 comprises a switch 11 and end stations 13, 14 as of the system of FIG. 1. Between the end station 13 and the switch 11, a converter 30 was mounted. The switch 11 supports one or more different kinds of contract. When the switch 11 does not support a kind of contract supported and requested by the end station 13 (in the example: UBR), but does support another kind of contract, which is not more unfavourable than the kind of contract requested by the source end station, then the converter 30 converts the kind of contract requested by the end station 13 into the other kind of contract (in the example: SBR).

Between the switch 11 and the end station 14, a converter 31 was mounted. The converter 31 fulfils the same function, for the end station 14 with respect to the switch 11, as the converter 30 fulfils for the end station 13 with respect to switch 11. Since the end stations 13, 14 generally request the same kind of traffic contract for traffic handling, the converters 30, 31 will differ since the converter 31 carries out a reverse conversion (in the example: from SBR into UBR).

The converters 30 and 31 may be part of a public ATM communication system of one or more networks, each having one or more switches, such as the switch 11. The converters 30 and 31 may also be part of a private ATM communication network having end stations 13 and 14, respectively. Although some links may be physically short, in FIG. 5, viewed from end station 13 in the direction of end station 14, the links 34, 35, 36, 37 may be distinguished.

Figure 6:
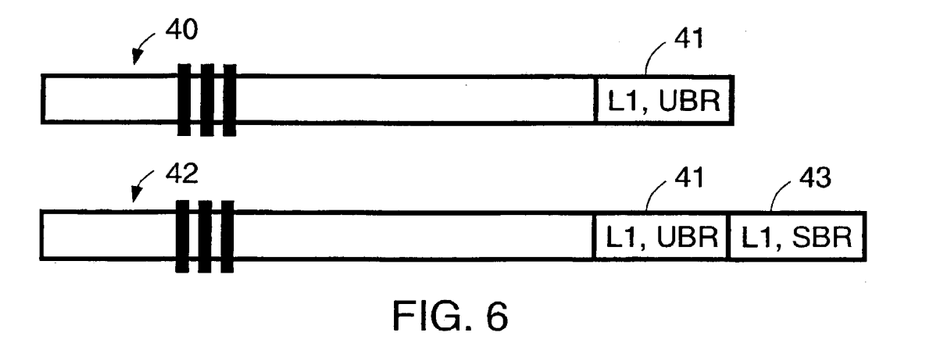
FIGS. 6 to 8 inclusive show examples of signalling messages over various links of the system of FIG. 5 according to three methods.
Figure 7:
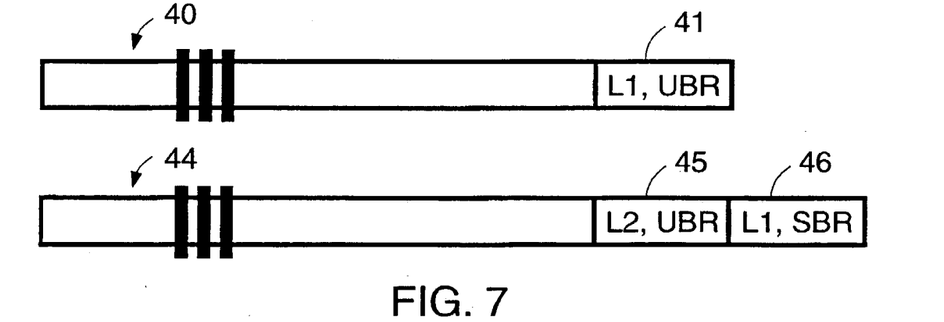
Figure 8:
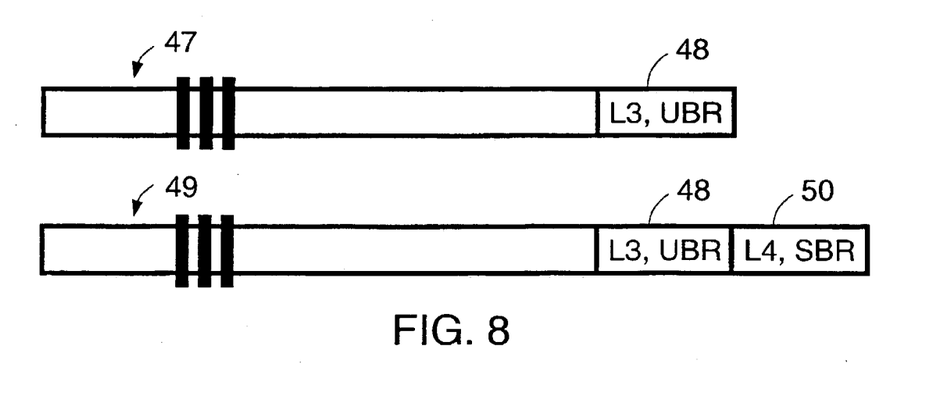

FIGS. 6, 7 and 8 schematically show examples of signalling messages of the kind explained in combination with FIG. 4, which are transmitted according to three different methods over the links 34 to 37 inclusive of the system of FIG. 5.

Below, it is assumed that both end stations 13 and 14 apply a traffic handling according to the UBR kind of contract. Although it may be agreed that IEs having specific functions are included in respective, predetermined locations of signalling messages, it is further assumed that ATC IEs are distinguished from other IEs by means of a label L, which may be a number. Only for the sake of convenience, in FIGS. 6 to 8 inclusive the ATC IEs are shown at an end of the signalling messages.

According to the method explained in combination with FIG. 6, the signalling message 40, whose ATC IE 41 contains a label L1 (meaning: the IE contains an indication for a requested kind of contract) and an indication of the UBR kind of contract, is transmitted over the link 34.

Since, according to the example, the switch 11 does not support the UBR kind of contract, but does support the more favourable SBR kind of contract, the converter 30 modifies the signalling message 40 into a signalling message 42, which is transmitted over the link 35. According to the example of FIG. 6, the signalling message 42 contains the ATC IE 41 of the signalling message 40 and an ATC IE 43, added by the converter 30, which again contains the label L1 and an indication for the SBR kind of contract supported by the switch 11.

The label L1 therefore has a significance which depends on the number of IEs having the label L1 which contains the signalling message 40, 42, i.e., the IE having the label L1 contains an indication for a kind of contract which was, or will be, requested prior to or after the conversion as the case may be. Since ATC IEs 41 and 43 both have the same label L1, their locations with respect to one another are of importance for the switch 11 in the signalling message 42. This is why said locations must comply with a rule to be drawn up for that purpose.

Over the link 36, the same signalling message 42 is transmitted as over the link 35. Since the converter 31 carries out a reverse conversion of the kinds of contract (from SBR into UBR), over the link 37 the same signalling message 40 is transmitted as over the link 34.

In the event of applying the method proposed by FIG. 7, the converter 30 converts the signalling message 40 transmitted over the link 34 into a signalling message 44 whose ATC IE 45 contains a label L2 (meaning: the IE contains an indication for the kind of contract which was requested prior to the conversion) and the kind of contract information UBR of the ATC IE 41. A second ATC IE 46 of the signalling message 44 contains the label L1 (meaning: the IE contains an indication for the kind of contract to which there has been converted) of the ATC IE 41 and the kind of contract information SBR of the kind of contract supported by the switch 11. When, departing from the source end station 13, there would have been converted into two or more other kinds of contract, the signalling message will contain more ATC IEs 46 and their locations in the signalling message 44 will be of importance. The converter 31 converts the signalling message 44 back into the signalling message 40.

An ATM communication network between two end stations, such as 13 and 14, may comprise a number of ATM networks, each having one or more switches, it being possible that the various switches support various kinds of contract or various groups of kinds of contract. Since furthermore a signalling message between an end station and the remainder of the system differs from a signalling message between two nodes or switches of the system, it may be desirable to distinguish the ATC IEs associated with the interface or the link between an end station and a converter or switch connected thereto from ATC IEs associated with interfaces between switches and converters. FIG. 8 shows an example of a method in which this is the case. According to FIG. 8, over the link 34 there is transmitted a signalling message 47 which differs from the signalling message 40 on account of the presence of an ATC IE 48 instead of the ATC IE 41, the label L1 of the information element 41 having been replaced by a label L3 (meaning: the IE contains an indication of a kind of contract which was requested by the source end station) reserved for the interface between an end station and a switch. The converter 30 converts the signalling message 47 into a signalling message 49 which consists of the signalling message 47 plus an ATC IE 50 which contains a label L4 (meaning: the IE contains an indication of a kind of contract applied between switches and converters) reserved for interfaces between switches 11, 12 and converters 30, 31 and a kind of contract associated with said interface, e.g., SBR. When the converters 30 en 31 of the system of FIG. 5 are associated with private ATM systems, in order to distinguish between private and public domains, over the links 34 and 37, instead of the signalling message 40, the signalling message 47 might be transmitted.

Figure 9:
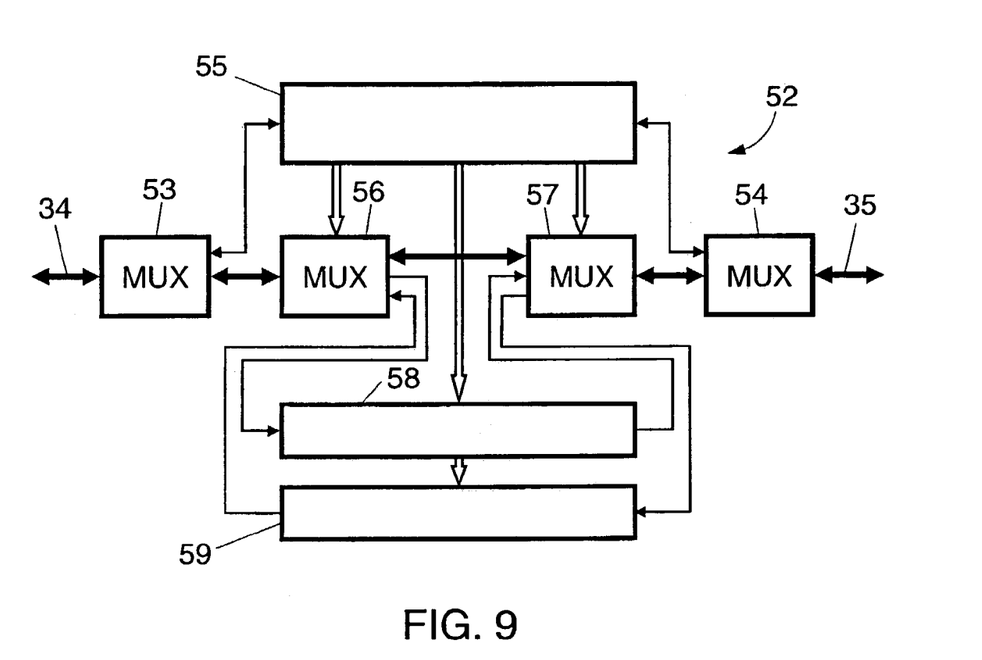
FIG. 9 shows a diagram of a converter of a kind of contract for insertion into a link.

FIG. 9 shows a diagram of an independent converter of a kind of contract. The converter 52 shown in FIG. 9 is suitable for bidirectional data transmission.

According to FIG. 9, the converter 52 includes multiplexers 53, 54 for connection to links, such as the links 34, 35 of FIG. 5, respectively. For a traffic flow received by the multiplexer 53 from outside the converter 52, the multiplexer 53 separates information cells 20, as of FIG. 2, from the remainder of the traffic flow. The information cells 20 are delivered to an information-cell processor 55. The remainder of the traffic flow received by the multiplexer 53 is delivered to a multiplexer 56.

When a traffic source connected to the link 34, in the example: the source end station 13, requests traffic handling according to a kind of traffic contract supported by a traffic destination connected to the link 35, in the example: the switch 11, the multiplexer 56 delivers a traffic flow received from the multiplexer 53 to a multiplexer 57, which delivers it, by way of the multiplexer 54, to the link 35.

When the traffic source connected to the link 34 does not support the requested kind of traffic contract, but another kind of contract which is not more unfavourable than the kind of contract requested by the source end station 13, is supported by the traffic destination, the multiplexer 56, under control of the information-cell processor 55, delivers a traffic flow received from the multiplexer 53 to a traffic-adapting means 58. The traffic-adapting means 58 adapts the traffic flow received by it, under control of the information-cell processor 55, to the other kind of traffic contract, and delivers the adapted traffic flow, by way of the multiplexers 57 and 54, to the link 35.

A traffic-adapting means 59 fulfils the same function for a traffic flow received by the multiplexer 54 from the link 35, by adapting it to the kind of contract supported on the side of the link 34.

During the setup of the connection, the information-cell processor 55 receives the information cells 20 from the multiplexer 53 or 54, joins the information from said information cells 20 to form a complete signalling message 24, and determines the presence therein of information elements IE1 to IEn inclusive, as illustrated in FIG. 4. Based on one or more of the information elements IE, the information-cell processor 55 determines whether the incoming traffic flow must be adapted for further transport according to another kind of contract or not. When no adaptation is required, the processor 55 controls the multiplexers 56 and 57 to deliver the traffic flow received by any of said multiplexers unaltered to the other of said multiplexers. In the other case, the processor 55 controls the multiplexers 56, 57 and the traffic-adapting means 58 for adapting the traffic flow to the kind of contract supported on the output side 35 of the converter 52.

Multiplexer 54, for a traffic flow coming from the link 35 and intended for the link 34, is identical to the multiplexer 53 and delivers information cells separated from said traffic flow to the information-cell processor 55 and delivers the remainder of the traffic flow to the multiplexer 57, which is identical to the multiplexer 56.

Figure 10:
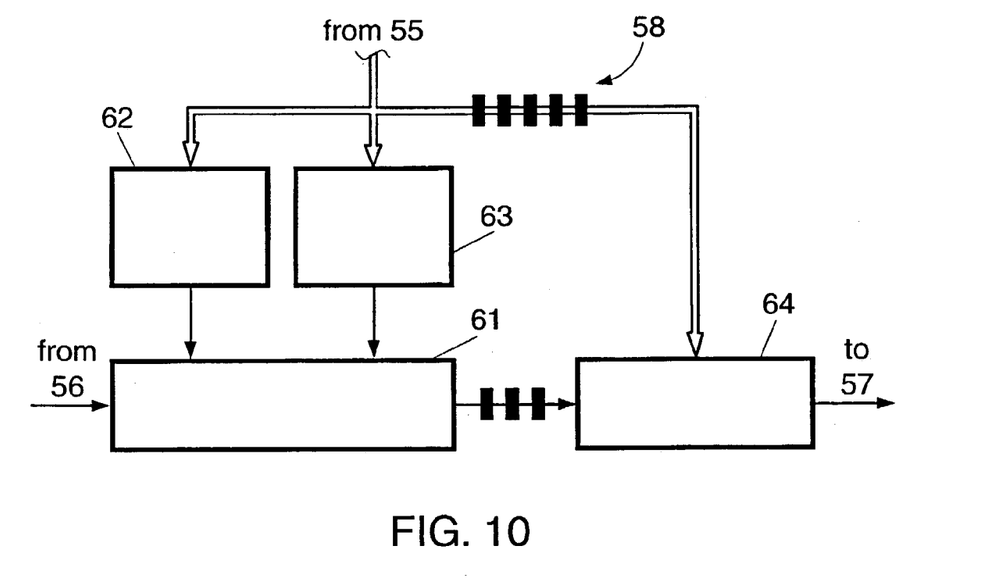
FIG. 10 shows a diagram of an adapter of a traffic flow of the converter of FIG. 9.

FIG. 10 shows a diagram of an embodiment of a traffic-adapting means, such as the adapting means 58 of FIG. 9. The adapting means 58 includes a data buffer 61 and, connected to the buffer 61, a maximum-level control 62, an output-dosage temporiser 63 and a cell-header-piece adapter 64. When the traffic-adapting means 58 must carry out an adaptation of the traffic flow, it receives data cells 21 from the multiplexer 56, which are explained in combination with FIG. 3. As an example, it is assumed that the kind of contract on the side of the link 34 is UBR, and the kind of contract on the side of the link 35 is SBR. The UBR kind of contract permits data cells which, within a time unit, are received in excess of a predetermined number, to be ignored. The SBR kind of contract does not have this restriction. By means of the control 62, the maximum is determined, up to which the data buffer 61 accepts data cells delivered thereto. The temporiser 63 determines, with which rate data cells are delivered from the buffer 61 to the cell-header-piece adapting means 64. Depending on the kind of contract and values of specific parameters thereof, more groups, consisting of a data buffer 61, a maximum-level control 62 and an output-dosage temporiser 63 may be mounted and the information-cell processor 55 may set the controls 62 and temporisers 63. If so required, the cell-header-piece adapting means 64, under control of the processor 55, adapts the header of the cells, e.g., the value of the cell-loss-priority bit CLP.

Figure 11:
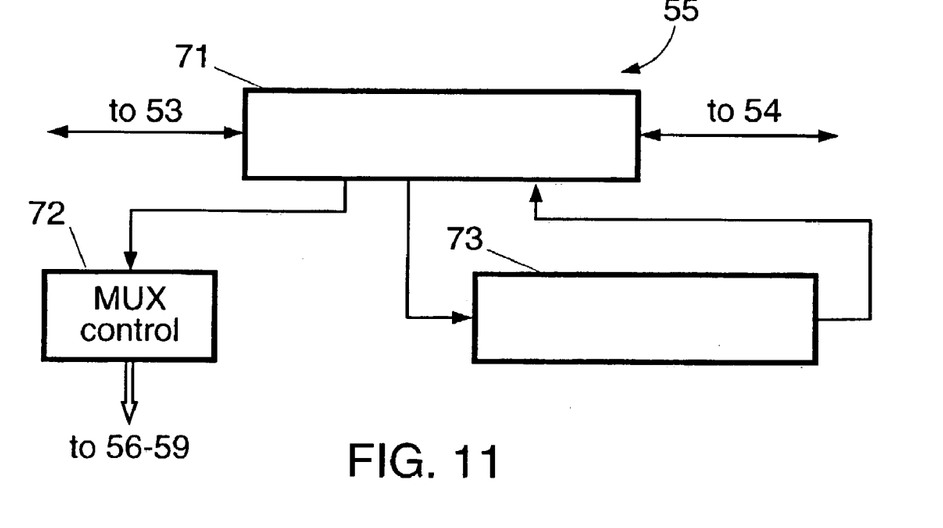
FIG. 11 shows a diagram of the information-cell processor of the converter of FIG. 9.

FIG. 11 shows a diagram of functional parts of which the information-cell processor 55 may consist. According to FIG. 11, the information-cell processor 55 includes a signalling-message interpreter 71 and, connected thereto, a multiplex control 72 and a signalling-message converter 73. The signalling-message interpreter 71 is connected to the multiplexers 53 and 54 for receiving therefrom, or delivering thereto, information cells 20 of the associated signalling message 24. Depending on the contents of the signalling message, particularly an ATC IE of the signalling message 24, the interpreter 71, by way of the multiplex control 72, controls the multiplexers 56, 57 and the traffic-adapting means 58, 59 for adapting the received traffic flow, or not. When the interpreter 71 has determined that a conversion must be carried out, the interpreter controls the signalling-message converter 73 for adapting the signalling message, as explained in combination with FIGS. 6 to 8 inclusive in such a way, that a receiver of the adapted signalling message is capable of determining that a conversion has taken place for, in accordance therewith, adapting back the traffic flow and converting back the signalling message, or not.

In general, the converter 52 of FIG. 9 will have so many pairs of traffic-adapting means 58, 59 as there are required simultaneous adaptations of the kind of contract. Even if the converter 52 need only adapt between two kinds of contracts, the application of a converter 52 requires a relatively large investment, since the converter 52 must be applied for each connection and an ATM switch in general is connected to a large number of links for a large number of connections.

Figure 12:
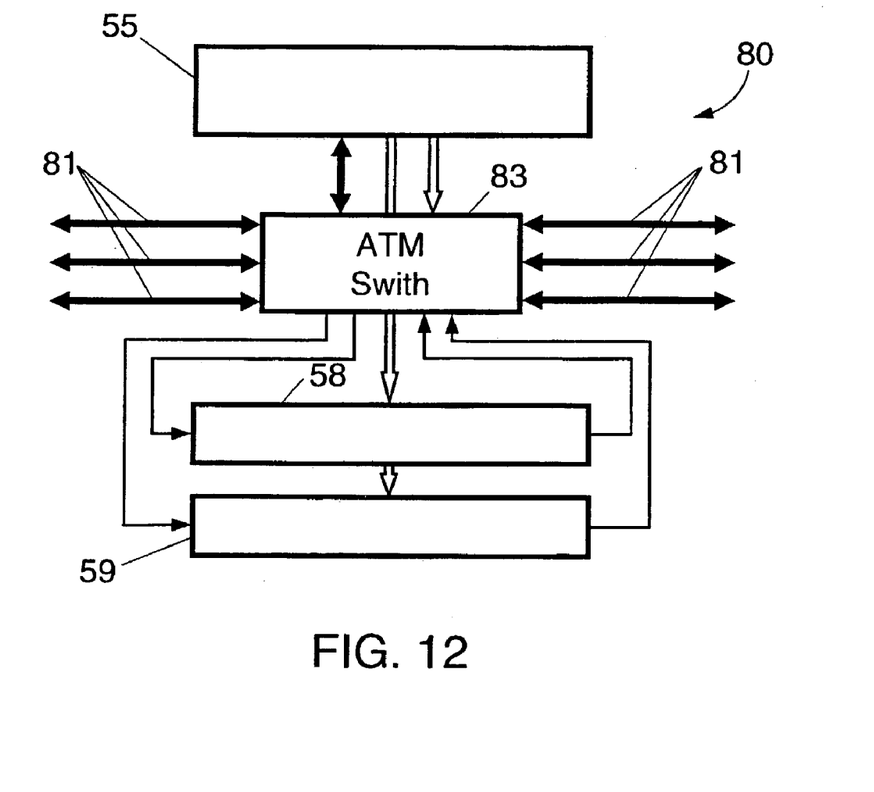
FIG. 12 shows a diagram of an ATM switch having integrated converters of the kind of contract.

FIG. 12 shows a diagram of an ATM switch 80 which is suitable for connecting to an number of links, such as 16 and 17 of FIG. 1, but which in FIG. 12 are each indicated by number 81 and which are connected to an ATM switching unit 83 of the switch 80. The switch 80 further comprises, connected to the switching unit 83, an information-cell processor 55 and traffic-adapting means 58, 59. The information-cell processor 55 and the traffic-adapting means 58, 59 of FIG. 12 are functionally identical to the processor 55 and the adapting means 58, 59 of FIG. 9, and there may be several groups, consisting of an information-cell processor 55 and traffic-adapting means 58, 59, connected to the ATM switching unit 83. According to need and in so far as they are available, said groups are to be assigned to a connection for which a conversion is to be carried out. By applying a switch in accordance with FIG. 12, a considerable saving may be achieved on equipment. Although in the event of ATM communication, a large part of the traffic is dealt with using programs and tables, particularly routing tables, in a computer of a switch, in the event of programmatic implementation of the switch 80 of FIG. 12, too, there may be achieved a considerable saving.

Figure 13:
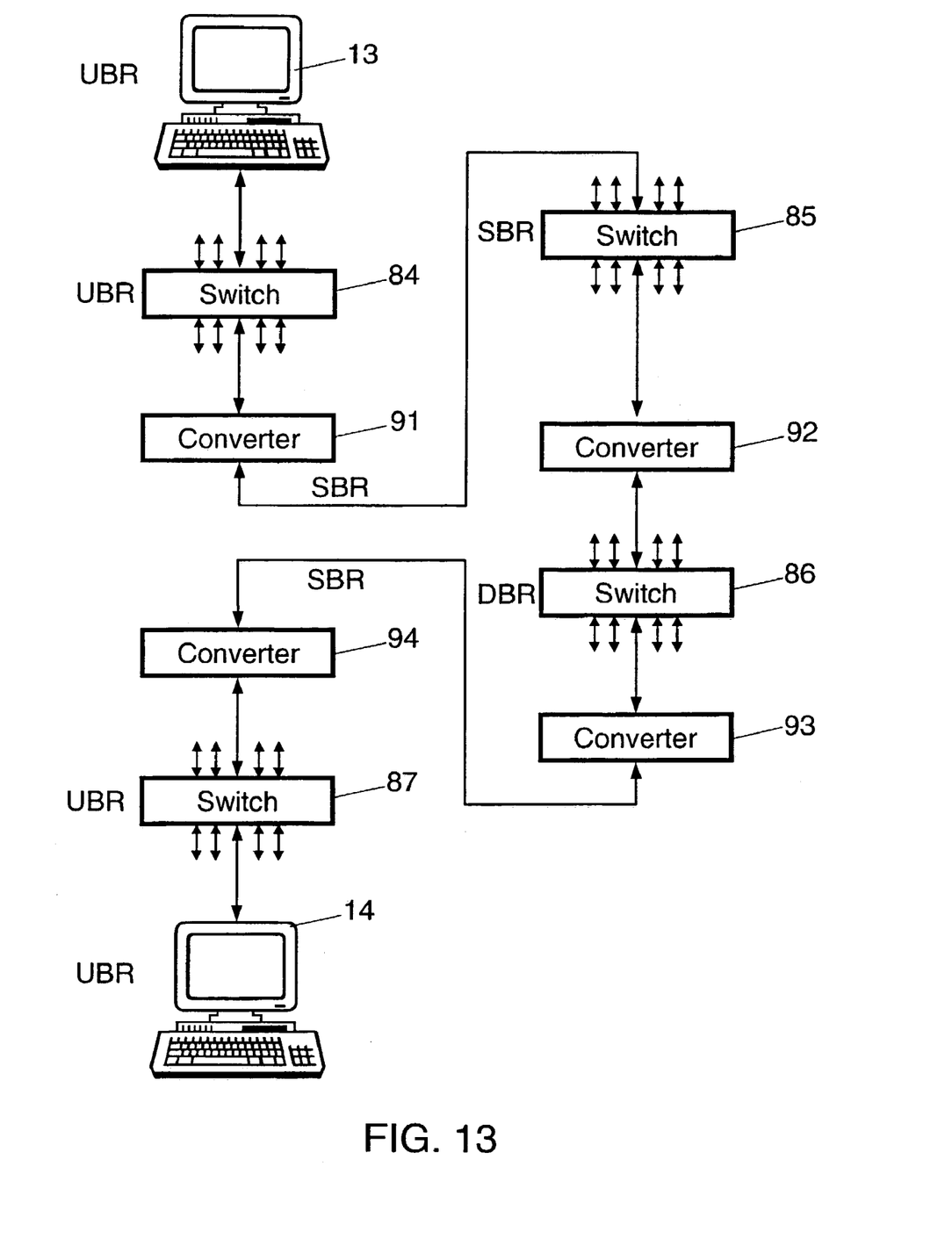
FIG. 13 shows a second embodiment of an ATM communication system according to the invention having a greater number of converters of the kind of contract.

FIG. 13 shows a second example of an ATM communication system to which the invention is applied. Between two end stations 13, 14, between which a connection is to be set up, the system includes a number of switches 84, 85, 86, 87. The switches 84 and 87 are switches of a private ATM network to which the respective end stations 13 and 14 are connected. The switches 85 and 86 are switches of, e.g., two coupled public ATM networks. It is assumed that, as indicated next to it, the end stations 13 and 14 support the UBR kind of contract. It is further assumed that the switch 85 is suitable for handling traffic according to the SBR kind of contract and that the switch 86 is capable of handling traffic according to the DBR kind of contract, as indicated next to the switches. Since there are several supported kinds of contract between the end stations 13 and 14, for setting up a connection between the end stations 13 and 14 it is necessary that a traffic flow between the end stations 13, 14 on interfaces having a transition, be converted to another kind of contract. For this purpose, a converter 91 is mounted between the switch 84 and the switch 85, and a converter 92 is mounted between the switch 85 and the switch 86, at least one converter, e.g., the converters 93 and 94, being mounted between the switch 86 and the switch 87. Although the converters 91 to 94 inclusive may be mounted in various locations with respect to the switches connected thereto, the converter 91 is part of, e.g., the private network having the switch 84, the converters 92 and 93 are part of the same public network, and the converter 94 is part of a private network having the switch 87. For a traffic flow running from the source end station 13 to the destination end station 14, the converters 91, 92, 93, 94 carry out a conversion from UBR to the more favourable SBR, from SBR to the more favourable DBR, from DBR to SBR and from SBR to UBR, respectively.

The various signalling messages over the connection between the end stations 13 and 14 may be completed, in the way explained in combination with FIGS. 6, 7 and 8, by each of the converters 91 to 94 inclusive, with an information element IE on a kind of traffic contract, and stripped of such a completed IE.

Figure 14:
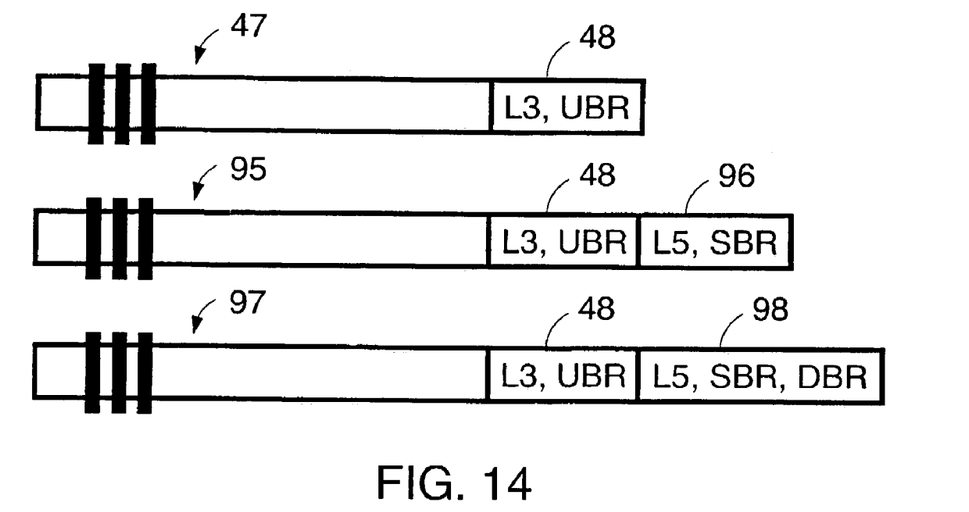
FIGS. 14 and 15 show examples of signalling messages over links of the system of FIG. 13 according to two different methods.
Figure 15:
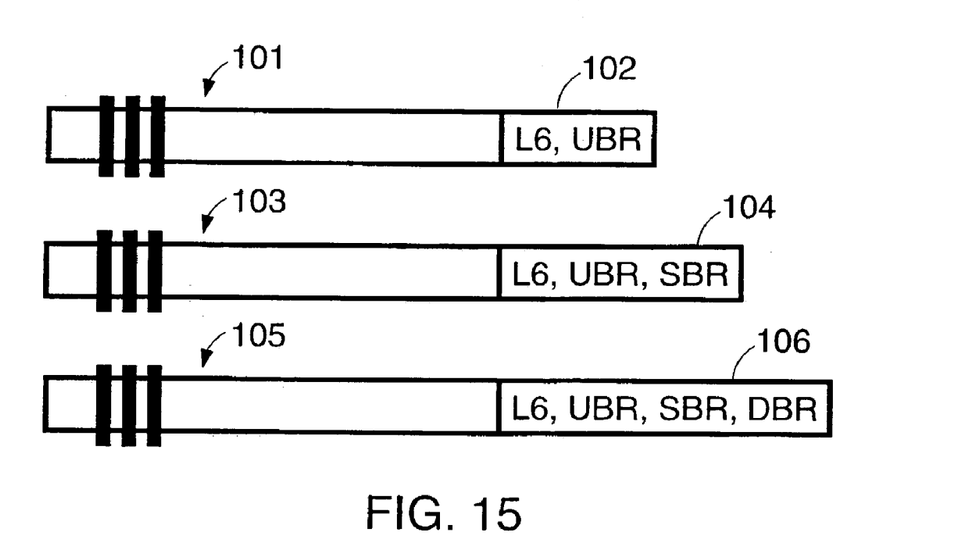

FIGS. 14 and 15 show two alternative methods for completing signalling messages by traffic-contract-kind IEs, and for stripping or adapting them, which may be particularly suitable when, over the connection between the end stations 13 and 14, a large number of conversions are carried out, various networks of various operators having to be passed, and groups of one or more switches, e.g., the switch 86, having a converter 92, 93 on either side, being desired to be kept transparent for the traffic flow.

It is assumed that, when setting up a connection, the source end station 13 of FIG. 13 delivers information cells from a signalling message 47 as explained in combination with FIG. 8. The contract-kind information element, ATC IE 48 of the signalling message 47, comprises a label L3 which is reserved for use by end stations, such as 13 and 14. Furthermore, the ATC IE 48 contains an indication of the kind of contract requested by the source end station, UBR in this example. The converter 91 converts the signalling message 47 into a signalling message 95 which comprises the ATC IE 48 of the signalling message 47, completed by an ATC IE 96. The IE 96 contains a label L5 which is reserved for traffic between network nodes or switches, and which indicates that the IE 96 represents a stack of the kind "last in, first out" (LIFO) containing indications of kinds of contract into which conversion has taken place, and in so far as required for carrying out a reverse conversion. The converter 91 completes the stack ATC IE 96 by an indication of the SBR kind of contract. The converter 92 modifies the signalling message 95 into a signalling message 97 by the ATC IE 48 and an ATC IE 98 whose label L5 indicates that it contains a stack of contract-kind indications, in this instance SBR and DBR. The converter 93 carries out a reverse conversion of the DBR kind of contract into the SBR kind of contract, in such a manner that a signalling message between the converters 93 and 94 has the form of the signalling message 95 of FIG. 14. The converter 94 carries out a reverse conversion of the SBR kind of contract into the UBR kind of contract, in such a manner that a signalling message between the converter 94 and the source end station 14 has the form of the signalling message 47 of FIG. 14.

The method according to FIG. 15 differs from the method according to FIG. 14, since the signalling messages 47, 95, 97 are replaced by a signalling message 101 having an ATC IE 102, a signalling message 103 having an ATC IE 104, and a signalling message 105 having an ATC IE 106, respectively. The signalling messages 101, 103 and 105 contain only one ATC IE whose label L6 indicates that the ATC IE contains a stack of the kind "last in, first out" (LIFO) of contract-kind indications. The signalling message 101 contains the UBR indication, the signalling message 103 contains the UBR and SBR indications, and the signalling message 105 contains the UBR, SBR and DBR indications. Since the signalling messages in the example of FIG. 15 contain only a single ATC IE, and therefore a single label L6, the signalling messages 101, 103, 105 may be shorter than the other signalling messages explained above.

It is possible that the connection of the source end station 13 to the destination end station 14 passes switches or converters which support kinds of traffic contract which enable an earlier reverse conversion to a less favourable kind of traffic contract etc., even into the kind of traffic contract requested by the source end station 13. When, e.g., the switch 86 of FIG. 13, in addition to DBR, also supports UBR, the converter 92 may be made suitable to convert from SBR into UBR in such a manner that the switch 86 and the converters 93 and 94 can be transparent or absent for the traffic flow according to the UBR kind of contract delivered by the converter 92. As an alternative, such as when the switch 86 supports only DBR, the converter 93 might directly convert DBR into UBR, as a result of which the converter 94 may be transparent or absent. In all of these cases, it suffices that the signalling message contains an indication, over all links in one or two traffic-contract-kind IEs, of the kind of traffic contract requested by the source end station 13, and possibly an indication of another kind of traffic contract into which there was most recently converted and which is the valid requested kind of traffic contract. For this purpose, the kind of signalling messages 40, 42, 44, 47, 49, 95, 101, 103 shown in FIGS. 6–8, 14 and 15 may be used.

The invention claimed is:

1. Communication method for transmitting digital information cells (20) and data cells (21) in asynchronous transmission mode (ATM) in an ATM communication system comprising two or more end stations (13, 14) and one or more switches (11, 84–87), a source end station (13) and a destination end station (14) of the end stations (13, 14) being connected to one another by means of links (16–18, 34–37) by way of one or more of the switches, the source end station (13) and each switch for setting up a connection between the source end station (13) and the destination end station (14), starting at the source end station (13), delivering a signalling message (24) to a next switch or the destination end station (14), as the case may be, the signalling message (24) being formed by several information cells (20), the signalling message (24) comprising several information elements (IEs), a traffic-contract-kind information element (IE) containing an indication which indicates a kind of traffic contract (ATC) requested from a next switch or the destination end station (14), each switch processing, in accordance with an indication received by the switch, a traffic flow following the signalling message and consisting of data cells, and a kind of traffic contract requested by the source end station (13) and a kind of traffic contract requested from the destination end station (14) being one and the same end-station traffic-contract kind, characterised in that, when a switch or the destination end station does not support a kind of traffic contract requested therefrom, but does support another kind of traffic contract which is not more unfavourable than the end-station traffic-contract kind, the signalling message, preceding delivery thereof to the switch or the destination end station from which the kind of traffic contract is requested, is converted by:

in so far as the indication is not yet present in the signalling message, adding, to the signalling message, an indication which designates the other kind of traffic contract as the kind of contract requested, and when the signalling message contains an indication which designates the other kind of traffic contract, but not as the kind of traffic contract requested, removing from the signalling message the indication for the kind of traffic contract immediately preceding the conversion.

2. Method according to claim 1, characterised in that the number of indications for kinds of traffic contract consecutively requested from switches and the destination end station in the signalling message (40, 42, 44, 47, 49, 95, 101, 103) does not exceed the number two, of which one is an indication for the end-station traffic-contract kind.

3. Method according to claim 1, characterised in that, for removing indications of the kind of traffic contract during consecutive conversions, a sequence for removing the indications is applied which is the reverse of a sequence with which the indications were earlier added to the signalling message.

4. Method according to claim 1, characterised in that the conversion is carried out by a conversion into a least favourable kind of traffic contract, which is not less favourable than the end-station traffic-contract kind.

5. Method according to claim 1, characterised in that, when at an input side of a switch, or of a number of consecutive switches supporting the same kind of traffic contract, a conversion has been carried out, at the output side of the switch, or of a last of the number of switches, as the case may be, a reverse conversion is carried out for the same kinds of traffic contract as during the preceding conversion.

6. Method according to claim 1, characterised in that an order of indications (41, 43, 45, 48) of the valid kinds of traffic contract and those requested earlier is determined in the signalling message (40, 42, 44, 47, 49) by a time sequence with which the indications are added to the signalling message.

7. Method according to claim 1, characterised in that labels are assigned to information elements, which contain indications of the kind of traffic contract, whose label of the information element having the indication for the valid requested kind of traffic contract differing from the other labels, which are equal to, and whose order of the associated information elements is determined in the signalling message by the time sequence with which they are added to the signalling message.

8. Method according to claim 1, characterised in that labels are assigned to information elements which contain indications of the kind of traffic contract, whose label of the information element having the indication for the end-station contract kind differing from the other labels, which are equal to, and whose order of the associated information elements is determined in the signalling message by the time sequence with which they are added to the signalling message.

9. Method according to claim 1, characterised in that indications being added to the signalling message (47, 95, 97) are ordered in one single information element (96, 98), and that an order of indications is determined, in the single information element, by the time sequence with which the indications are added.

10. Method according to claim 1, characterised in that all indications of the signalling message (101, 103, 105) are ordered in one single information element (102, 104, 106), and an order of indications is determined, in the single information element, by the time sequence with which the indications are added.

11. Communication system for transmitting, in asynchronous transmission mode (ATM), digital information cells (20) and data cells (21), comprising two or more end stations (13, 14) and one or more switches (11, 84–87), a source end station (13) and a destination end station (14) of the end stations (13, 14) being connected to one another by means of links (16–18, 34–37) by way of one or more of the switches, the source end station (13) and each switch for setting up a connection between the source end station (13) and the destination end station (14), starting at the source end station (13), delivering a signalling message (24) to a next switch or the destination end station (14), as the case may be, the signalling message (24) being formed by several information cells (20), the signalling message (24) comprising several information elements (IEs), a traffic-contract-kind information element (IE) containing an indication which indicates a kind of traffic contract (ATC) requested from a next switch or the destination end station (14), each switch processing, in accordance with an indication received by the switch, a traffic flow following the signalling message, consisting of data cells, and a kind of traffic contract requested by the source end station (13) and a kind of traffic contract requested from the destination end station (14) being one and the same end-station traffic-contract kind, characterised in that, when a switch or the destination end station does not support a kind of traffic contract requested therefrom, but does support another kind of traffic contract which is not more unfavourable than the end-station traffic-contract kind, in the link over which the non-supported kind of traffic contract is requested, a converter is mounted which converts the signalling message intended for the switch or for the destination end station, the converter being equipped with:

means for, in so far as the indication is not yet present in the signalling message, adding, to the signalling message, an indication which the other kind of traffic contract designates as the kind of contract requested, and means which, when the signalling message contains an indication designating the other kind of traffic contract, but not as the kind of traffic contract requested, remove from the signalling message the indication for the kind of traffic contract immediately preceding the conversion.

12. Traffic-contract-kind converter (52) for a communication system for transmitting, in asynchronous transmission mode (ATM) digital information cells (20) and data cells (21), the system comprising two or more end stations (13, 14) and one or more switches (11, 84–87), a source end station (13) and a destination end station (14) of the end stations (13, 14) being connected to one another by means of links (16–18, 34–37) by way of one or more of the switches, the source end station (13) and each switch for setting up a connection between the source end station (13) and the destination end station (14), starting at the source end station (13), delivering a signalling message (24), being formed by a number of information cells (20), to a next switch or the destination end station (14), the signalling message (24) comprising a number of information elements (IEs), a traffic-contract-kind information element (IE) containing an indication which indicates a kind of traffic contract (ATC) requested from a next switch or the destination end station (14), each switch processing, in accordance with an indication received by the switch, a traffic flow following the signalling message, consisting of data cells, and a kind of traffic contract requested by the source end station (13) and requested from the source end station (14) being one and the same end-station traffic-contract kind, characterised by a first multiplexer (53) having an input for connection to a link (34) for the connection to be set up, and a number of outputs for, depending on a control signal received by the first multiplexer (53), passing on to specific outputs thereof information cells (20) and data cells (21) received over the connection at the input, a second multiplexer (56) having a number of inputs and a number of outputs for, depending on a control signal delivered to the second multiplexer (56) passing on, to specific outputs thereof, data cells received from the first multiplexer (53), a traffic-adapting means (58) which adapts a flow of data cells (21) received from the second multiplexer (56) for delivering a data-cell flow corresponding to another kind of traffic contract than the kind of traffic contract requested and received by way of the link (34), a third multiplexer (57) having a number of inputs and outputs for, depending on a control signal received at an output thereof, delivering a flow of data cells received from the traffic-adapting means (58), an information-cell processor (55) which:

composes the information cells received from the input of the first multiplexer (51) to form a signalling message received (24), distinguishes information elements, from the signalling message received, which contain an indication for a kind of traffic contract requested by means of the signalling message received, when the requested kind of traffic contract at the output side of the converter is supported, controls the first, second and third multiplexers (53, 56, 57) for conducting the data cells, without insertion of the traffic-adapting means (58), from the input of the first multiplexer (53)—to the output of the third multiplexer (57), when the requested kind of traffic contract at the output side of the converter is not supported, but the kind of traffic contract applied by the traffic-adapting means (58) is supported, controls the first, second and third multiplexers (53, 56, 57) and the traffic-adapting means (58) for conducting the received data cells (21), with insertion of the traffic-adapting means (58), from the input of the first multiplexer (53) to the output of the third multiplexer (57), converts the indication of the kind of traffic contract requested into an indication which supports the kind of traffic contract applied by the traffic-adapting means (58), and a fourth multiplexer (54) which is controlled by the information-cell processor (55) for delivering to an output of the converter (52) the signalling message, whether converted or not, as the case may be, by the processor (55) and subsequently the flow of data cells, whether adapted by the traffic-adapting means (58) or not.

13. Switch (80) for a communication system for in asynchronous transmission mode (ATM) transmitting digital information cells (20) and data cells (21), the system comprising two or more end stations (13, 14) and one or more switches (11, 84–87), a source end station (13) and a destination end station (14) of the end stations (13, 14) being connected to one another by means of links (16–18, 34–37) by way of one or more of the switches, the source end station (13) and each switch for setting up a connection between the source end station (13) and the destination end station (14), starting at the source end station (13), delivering a signalling message (24) to a next switch or the destination end station (14), as the case may be, the signalling message (24) being formed by a number of information cells (20), the signalling message (24) comprising a number of information elements (IEs), an information element (IE) on the kind of traffic contract containing an indication which indicates a kind of traffic contract (ATC) requested from a next switch or the destination end station (14), each switch corresponding to an indication received by the switch processing a traffic flow consisting of data cells following the signalling message, and a kind of traffic contract requested by the source end station (13) and requested from the destination end station (14) being one and the same kind of traffic contract of an end station, characterised by an ATM switching unit (83) having a number of inputs and outputs for connection to various links (81) of various connections for selectively setting up the various connections, an information-cell processor (55), which is connected to the switching unit (83), and a traffic-adapting means (58, 59) which is connected to the switching unit (83) and the information-cell processor (55), with:

the information-cell processor (55) deriving information cells (20) from a connection to be set up at an input of the switching unit (83), the information-cell processor (55) composing a signalling message (24) from the derived information cells, the information-cell processor (55) separating, from the signalling message, an information element containing an indication for a requested kind of traffic contract for processing data cells (21) received at the input of the switching unit after the information cells, the information-cell processor (55) checking whether the requested kind of traffic contract is supported at the output side of the output of the connection to be set up, the information-cell processor (55) controlling the switching unit (83) for passing on, from the input of the switching unit (83) to the output of the switching unit, data cells when the requested kind of traffic contract is supported at the output side of the output of the switching unit (83), the information-cell processor (55), the switching unit (83) and a traffic-adapting means (58, 59) supporting another kind of traffic contract at the output side of the output of switching unit (83) controlling for conducting the data cells received from the input of the switching unit (81) by way of the traffic-adapting means (58, 59) to the output of the switching unit (83), the information-cell processor (55), after setting up the connection, making the switching unit (83), free traffic-adapting means (58, 59) and itself available for setting up another connection.

* * * * *